United States Patent
Tanaka et al.

[11] Patent Number: 5,697,680
[45] Date of Patent: Dec. 16, 1997

[54] VEHICLE BRAKE PRESSURE CONTROLLER

[75] Inventors: Eiji Tanaka, Anjo; Kyoji Kawano, Nukata-gun, both of Japan

[73] Assignee: Nippondenso Co., Ltd., Kariya, Japan

[21] Appl. No.: 646,136

[22] Filed: May 7, 1996

Related U.S. Application Data

[63] Continuation of PCT/JP95/01760, filed Sep. 4, 1995.

[30] Foreign Application Priority Data

Sep. 8, 1994 [JP] Japan .................. 6-214758

[51] Int. Cl.$^6$ .................................. B60T 8/58
[52] U.S. Cl. ............. 303/125; 303/139; 303/84.1
[58] Field of Search ............................ 303/125, 139, 303/140, 116.1, 116.2, 87, 84.1, 10, 11

[56] References Cited

U.S. PATENT DOCUMENTS

| | | |
|---|---|---|
| 4,715,667 | 12/1987 | Otsuki et al. |
| 4,846,535 | 7/1989 | Kuwana et al. |
| 4,865,399 | 9/1989 | Atkins et al. .......... 303/116.2 |
| 4,900,102 | 2/1990 | Jonner et al. |
| 4,952,002 | 8/1990 | Arikawa et al. .......... 303/116.1 |
| 5,271,667 | 12/1993 | Takata et al. .......... 303/116.1 X |
| 5,558,414 | 9/1996 | Kubota .......... 303/116.1 X |

FOREIGN PATENT DOCUMENTS 3-52269  5/1991  Japan.

*Primary Examiner*—Lee W. Young
*Attorney, Agent, or Firm*—Cushman, Darby & Cushman IP Group of Pillsbury Madison & Sutro LLP

[57] ABSTRACT

SM valves 50FL, 50FR are in an open position which opens a line when electric power is OFF and are switched to a closed position when energized by a brake controller 30. These SM valves 50FL, 50FR are formed integrally with the pressure regulation valves (here, the closed position refers to the position (pressure regulation position) where the lines are opened when pressure applied from W/C 2FL, 2FR side is over a predetermined value and the SM valves function as pressure regulation valves). Also, restrictions 50FLS, 50FRS are provided across a switching region where the opening and closing of the SM valve 50FL, 50FR is executed in the M/C 234 side to apply pressure between the restrictions 50FLS, 50FRS and the switching region. In this way, aeration which occurs when high pressure fluid is returned to the M/C side is prevented and thus, vapor locks can be prevented.

9 Claims, 9 Drawing Sheets

VEHICLE BRAKE PRESSURE CONTROLLER

This is a continuation of PCT/JP95/01760 filed Sep. 4, 1995.

FIELD OF INDUSTRIAL APPLICATION

The present invention relates to a vehicle brake pressure controller which is, for example, used in anti-skid control, traction control and the like.

BACKGROUND ART

Figure 9:
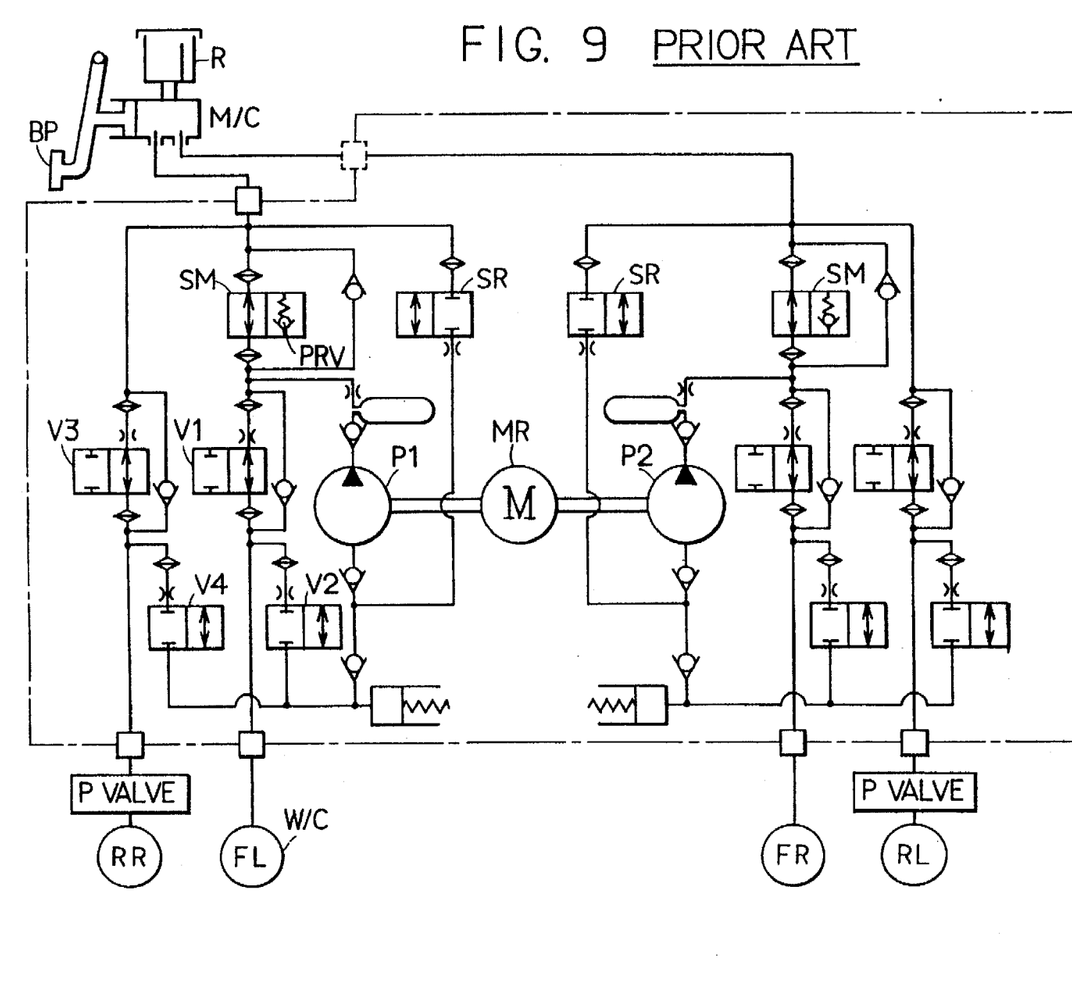
FIG. 9 is an explanatory diagram of the hydraulic circuit according to prior art.

Conventionally, as a vehicle brake pressure controller used in, e.g., anti-skid control, traction control and the like, for example, a hydraulic circuit shown in FIG. 9 having a construction where hydraulic pumps P1, P2 are controlled by means of a hydraulic motor MR has been proposed.

This hydraulic circuit performs anti-skid and traction control during front engine front wheel driving (FF) and is configured with valves along a brake fluid line extending from a master cylinder (M/C) to wheel cylinders (W/C) of front left and right wheels FL, FR for executing normal brake operations (in accordance with the driver's depression of a brake pedal BP), anti-skid control, traction control and the like. Concretely, these valves include a master cylinder cut valve (SM valve) for cutting brake fluid supply from the M/C, a reservoir cut valve (SR valve) for closing inlet sides of the hydraulic pumps P1, P2 from a reservoir R of the M/C side, magnetic valves V1–V4 for holding and releasing high pressure provided to the W/C, and the like.

Then, when performing anti-skid control with this hydraulic circuit (the circuits of the FL wheel and an RR wheel at the left side of the Figure are described hereinafter), the SM valve is kept in an open state together with keeping the SR valve in a closed state, the hydraulic pump P1 is driven so that fluid from the reservoir R is circulated, and the states of pressure increase, pressure hold and pressure decrease are switched appropriately by means of valves V3, V4 to control the braking force by holding or releasing braking force.

Also, when performing traction control, the line is closed by means of the SM valve and opened by means of the SR valve, brake hydraulic pressure of the W/C side is increased by driving the hydraulic pump P1, and the states of pressure increase, pressure hold and pressure decrease are switched by means of valves V1, V2 to control the braking force by holding or releasing braking force. However, here, when executing traction control, holding the SM valve at a closed state actually refers, as shown in FIG. 9, to the state of switching the SM valve from an open state to a pressure regulator valve PRV.

However, when the SM valve is closed (set to the PRV side), this PRV performs the function of releasing brake fluid to the M/C side for safety purposes in cases when the hydraulic pressure of the W/C side becomes very high compared with the M/C side, and while this valve performs this very important function, the following problems have come about due to its construction.

In other words, generally, when brake fluid is released from a high pressure side to a low pressure side, while tiny air bubbles might be formed (i.e., aeration) due to such pressure difference, a great amount of fluid passes through the PRV and moreover, because the brake fluid is released at high pressure, the pressure difference is great and thus, there is the problem of the likely occurrence of aeration.

Therefore, for example, when normal brake operation is executed after the end of traction control, while these bubbles have not yet disappeared, there is the problem of decline in normal brake functions due to the occurrence of what is called a vapor lock phenomenon in which the bubbles acts as cushions.

As a countermeasure, one proposed device (refer to Japanese Patent Laid Open Publication No. Hei-2-18150) positions a first pressure control valve in a return route to a pressure medium container of the brake fluid together with positioning at a downstream side of the first pressure valve a second pressure valve which opens to the pressure medium container at a pressure of no more than 10 bars so that pressure is gradually lowered to avoid evaporation.

However, this technology does not solve the problem in the typical case in which the brake fluid is returned to the brake line. In short, to execute normal brake control, while the hydraulic pressure from the M/C side is transmitted to the W/C side when the brake pedal BP is depressed, in the device which performs anti-skid control and traction control, for the brake line supplied with the brake fluid, the high pressure brake fluid used in executing such traction control is returned to the M/C side via the SM valve. Then, while aeration occurs during the return of high pressure brake fluid, the device of the above-described publication does not prevent aeration in the PRV of the SM valve.

The present invention aims to solve the above-described problems and provide a vehicle brake pressure controller for preventing vapor lock by preventing aeration which occurs when high pressure fluid is returned to the M/C side.

STATEMENT OF THE INVENTION

In order to achieve the above-described objectives, in the present invention, boosted brake fluid is provided to a line, which connects a master cylinder side and a wheel cylinder side, by means of a high pressure supply unit which is a hydraulic pressure source, and the line is switched to open and close by means of a switching unit located between a position where brake fluid generated from a pump is supplied to the line and the master cylinder. Also, by means of a switching control unit, the switching unit is switched to an open state in which the line is opened and a pressure regulation state in which hydraulic pressure supplied from the high pressure supply unit is released to the master cylinder side when the hydraulic pressure exceeds a predetermined pressure. In addition, by means of a pressure application unit located across the pressure regulation member, which sets the pressure regulation state, in the master cylinder side, pressure is applied between the pressure regulation member and the pressure application unit itself. In short, in the present invention, the pressure application unit is disposed in the master cylinder side across the pressure regulation member (which sets the pressure regulation state) such as, for example, a pressure regulation valve, and by applying pressure between this pressure application unit and the pressure regulation member by means of this pressure application unit itself, sudden drops in the pressure which occur when high pressure brake fluid is released to the master cylinder from the pressure regulation member are prevented. That is, because sudden drops in the pressure in the pressure regulation unit are moderated by means of this pressure application unit, a remarkable effect of being able to completely prevent the occurrence of aeration in the pressure regulation member such as the pressure regulation valve is obtained.

In addition, a restriction which controls the flow of brake fluid can be employed as the pressure application unit.

Furthermore, an auxiliary pressure regulation valve whose opening valve pressure is set lower than the predetermined pressure set in the pressure regulation state can be employed as the pressure application unit.

Also, the switching valve and the pressure regulation valve are provided as the switching unit, wherein the switching valve is switched to line open and closed positions, and when the switching valve is in the closed position, the pressure regulation valve releases high hydraulic pressure to the master cylinder side if the hydraulic pressure supplied from the high pressure supply unit is no less than the predetermined pressure. In short, a construction in which the switching valve and the pressure regulation valve are provided separately can be employed in the present invention.

Moreover, the switching valve is used as the switching unit and this switching valve can be switched to an open position which opens the line and a pressure regulation position which releases high hydraulic pressure to the master cylinder side in case the hydraulic pressure supplied from the high pressure supply unit is no less than the predetermined pressure. That is, the switching valve which has an internal pressure regulation valve function can be employed in the present invention.

In addition, the pump or an accumulator can be used as the high pressure supply unit.

Also, by means of a common pump that is the hydraulic pressure source in anti-skid control and traction control, boosted brake fluid is generated to the line which connects the master cylinder side and the wheel cylinder side. Moreover, by means of the pressure control valve located between the location where the brake fluid generated from the pump is supplied to the line and the wheel cylinders, the supply and discharge of brake fluid to and from the wheel cylinders are controlled, and by means of the switching valve located between the location where the brake fluid generated from the pump is supplied to the line and the master cylinder, the opening and closing of the line is switched. Also, by means of the switching control unit, the switching valve is switched to the open state during anti-skid control together with switching the switching valve alternately between the open position and the closed position during traction control to regulate pressure of brake fluid generated from the pump. Furthermore, when the switching valve is in the closed position, high hydraulic pressure is released to the master cylinder side by means of the pressure regulation valve when the hydraulic pressure supplied from the high pressure supply unit is no less than the predetermined pressure, together with applying pressure between the pressure regulation valve and the pressure application unit by means of the pressure application unit.

In this way, there is the effect of being able to prevent the occurrence of aeration together with being able to perform control appropriately in accordance with conditions by switching the switching valve in accordance with anti-skid control and traction control conditions even when using a common hydraulic pressure source. It must be noted here that a pressure increase control valve and a pressure decrease control valve are examples of such pressure control valve.

Also, in particular, in case the pump is used as the hydraulic pressure source, when opening a passage, which refluxes for example from the master cylinder side to the pump, by means of an SR valve, there is the advantage of being able to make bubbles disappear even if aeration occurs by promoting repenetration through the reapplication of pressure and recompression using the pump.

BEST EMBODIMENTS FOR IMPLEMENTING THE PRESENT INVENTION

Embodiments of the present invention are explained hereinafter with reference to the drawings.
(First Embodiment)

Figure 1:
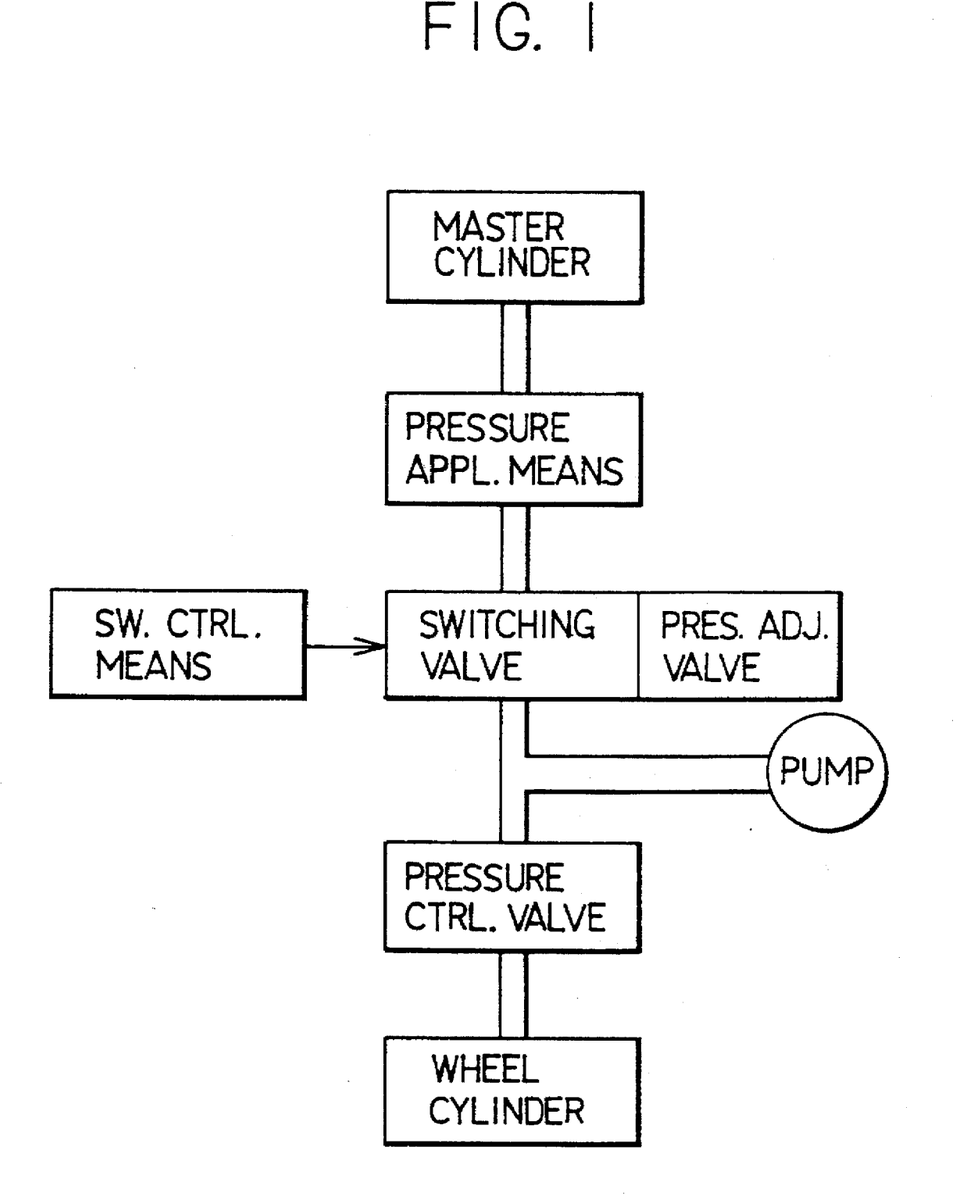
FIG. 1 is a block diagram showing a construction according to claim 7 of the present invention.
Figure 2:
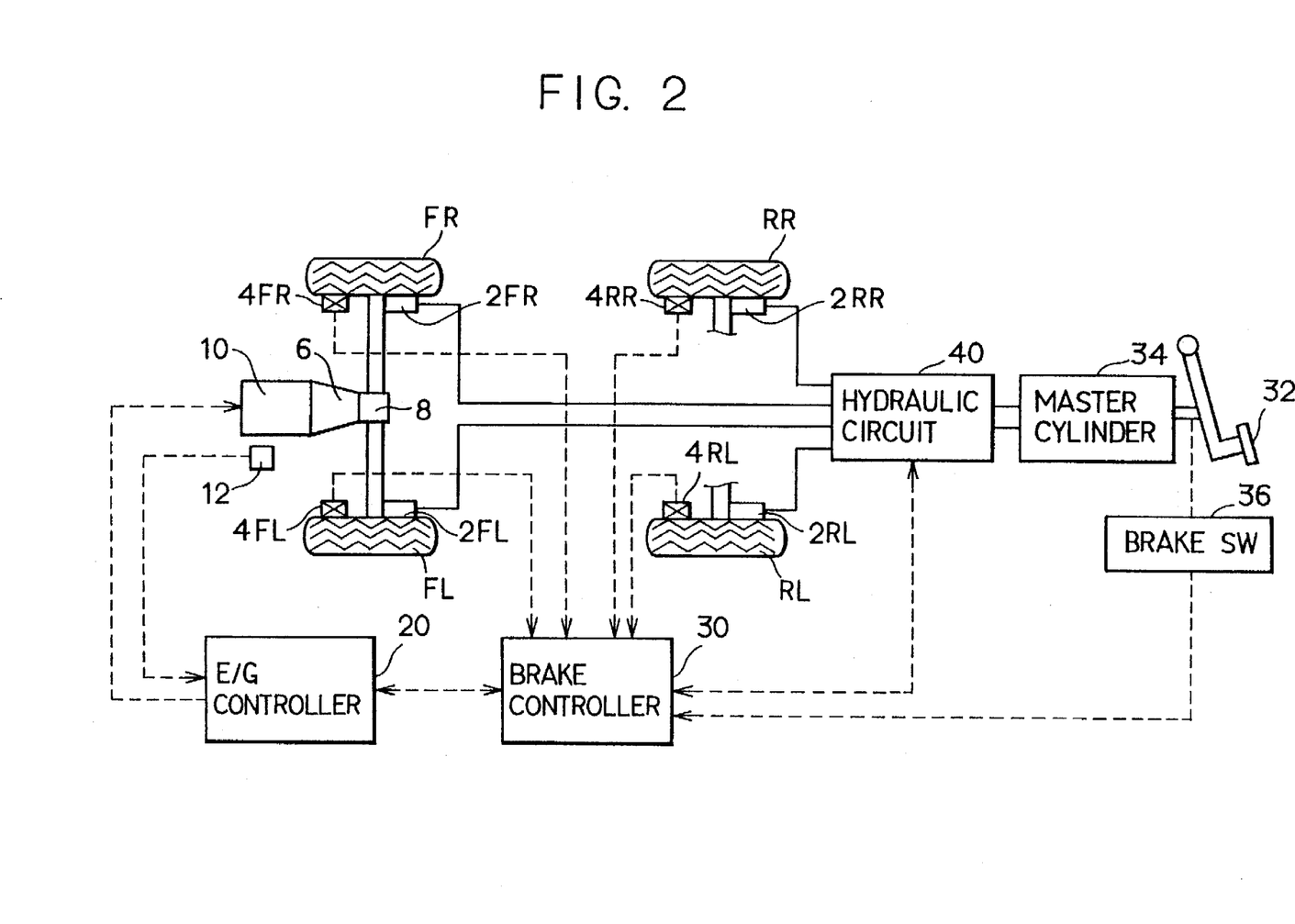
FIG. 2 is a schematic construction diagram showing an overall construction of a vehicle control system according to a first embodiment of the present invention.

First, FIG. 2 is a schematic construction diagram which shows an overall construction of a vehicle control system to which the present invention is applied. It must be noted here that the present embodiment is an application of the present invention to a front engine front drive (FF) four-wheeled vehicle and an example of the use of a self-contained pump, which sucks and returns brake fluid from and to a master cylinder (hereinafter referred to as M/C), as a hydraulic pump.

As shown in FIG. 2, the vehicle wheels (front left wheel FL, front right wheel FR, rear left wheel RL, rear right wheel RR) of the vehicle are provided with wheel cylinders (hereinafter referred to as W/C) 2FL, 2FR, 2RL, 2RR which provide driving power to each of the wheels FL-RR and speed sensors 4FL, 4FR, 4RL, 4RR which detect the rotation frequency of each of the vehicle wheels. Also, the front left and right wheels FL, FR (hereinafter, referred to simply as driving wheels), which are the driving wheels, rotate when they receive driving power from an internal combustion engine 10 connected via a transmission 6 and a differential gear 8. The internal combustion engine 10 which is the source of driving power is connected to a group of sensors 12 which detect its operational conditions such as its rotational speed, intake air volume, coolant temperature, throttle valve aperture (throttle aperture) and the like. Detection signals from these sensors 12 are provided to an engine (E/G) controller 20, and based on these detection signals, the E/G controller 20 controls fuel injection amount and ignition timing of the internal combustion engine 10.

Also, detection signals from the speed sensors 4FL-4RR provided on each of the vehicle wheels FL-RR are provided to a brake controller 30. By controlling various magnetic valves in a hydraulic circuit 40 provided in the fluid route from the M/C 34 which discharges brake fluid to the W/C 2FL-2RR of each of the vehicle wheels FL-RR in accordance with the depression of the brake pedal 32, the brake controller 30 controls slips that occur in the vehicle wheels during vehicle braking and vehicle acceleration and executes anti-skid control (hereinafter referred to as ABS control) and traction control (hereinafter referred to as TRC control). In addition, aside from the detection signals from each of the above-described speed sensors 4FL-4RR, the brake controller 30 operates after also receiving detection signals from a brake switch (hereinafter referred to as brake SW) 36, which is in an ON state when the brake pedal 32 is in operation, and hydraulic pressure sensors and the like (not shown in the Figure) and provided inside the hydraulic circuit 40 for detecting hydraulic pressure in the W/C 2FL, 2FR of the driving wheels FL, FR.

It must be noted here that the E/G controller 20 and the brake controller 30 are each made up of microprocessors which are mainly composed of a CPU, ROM, RAM and the like. Each of these controllers 20, 30 includes an interface for sending and receiving detection data from the sensors, control data and the like.

Next, the hydraulic circuit 40 is explained with reference to FIG. 3.

Figure 3:
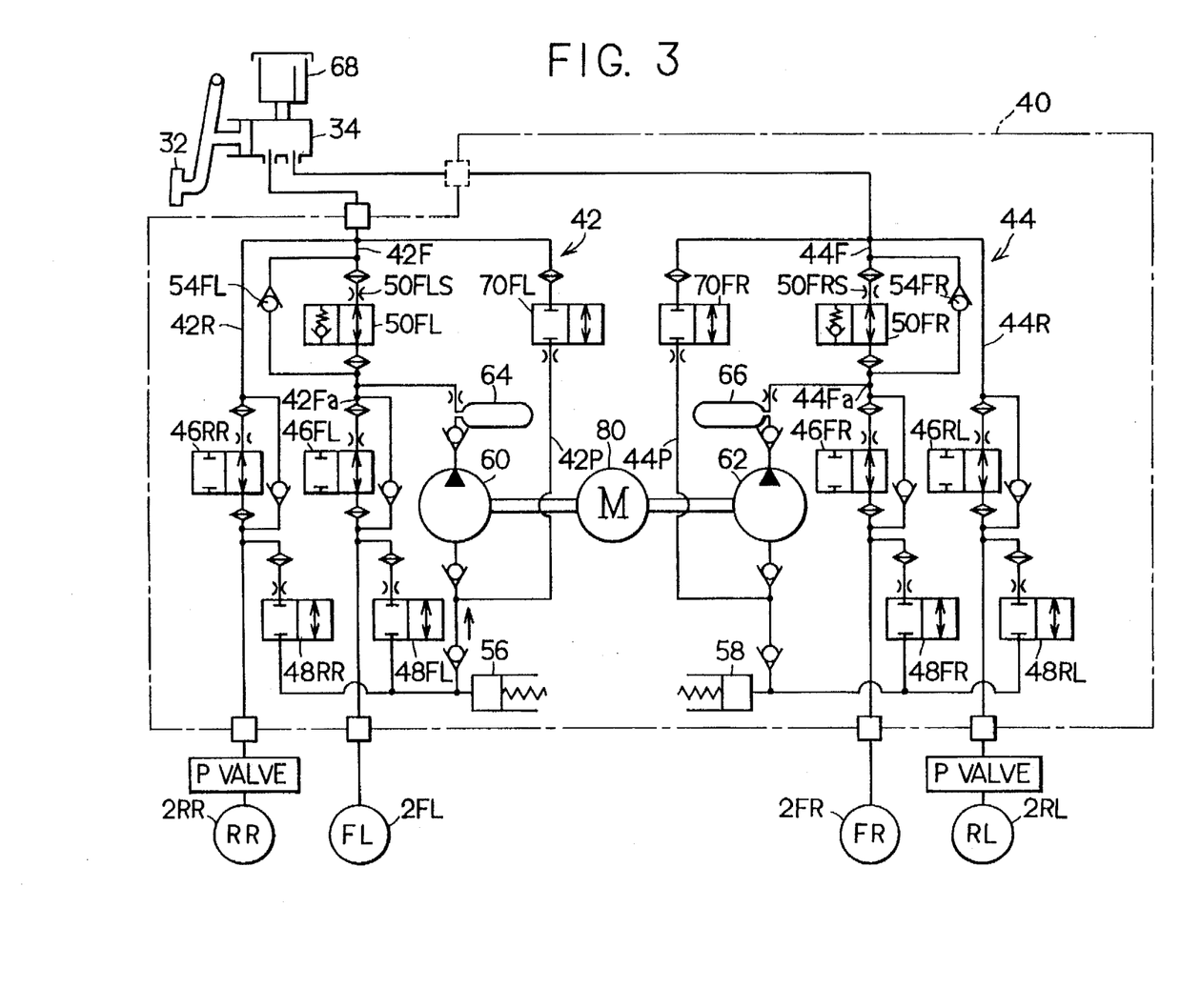
FIG. 3 is an explanatory diagram showing a construction of a hydraulic circuit of the first embodiment.

As shown in FIG. 3, the hydraulic circuit 40 includes two fluid routes 42, 44 for force feeding brake fluid from two fluid routes from the M/C 34 to the front left wheel FL and the rear right wheel RR, and the front right wheel FR and the rear left wheel RL. Also, hold valves (pressure increase control valves) 46RL, 46RR which can be switched between a pressure increase position for opening passages 44R, 42R and a hold position which closes such passages 44R, 42R, and pressure decrease valves (pressure decrease control valves) 48RL, 48RR which discharge brake fluid contained inside the W/C 2RL, 2RR are provided in fluid routes 44R, 42R that are in these fluid routes 44, 42 and that lead to W/C 2RL, 2RR of the rear left and right wheels RL, RR (hereinafter referred to as driven wheels) which are the driven wheels.

It must be noted here that normally pressure increase control valves 46RL, 46RR are in the pressure increase position and are switched to the hold position when energized by the brake controller 30. In addition, the pressure decrease control valves 48RL, 48RR are normally in the closed position and discharge brake fluid contained inside the W/C 2RL, 2RR when they switch to the open state when energized by the brake controller 30.

On the other hand, in each of the fluid routes 42, 44, in the same way as that of the fluid routes 44R, 42R of the driven wheels side, pressure increase control valves 46FL, 46FR and pressure decrease control valves 48FL, 48FR are provided as control valves in fluid routes 42F, 44F which lead to W/C 2FL, 2FR of the front left and right wheels FL, FR which are the driving wheels.

Also, master cylinder cut valves (SM valves) 50FL, 50FR which act as switching valves for opening/closing these fluid routes 42F, 44F are installed in these routes 42F, 44F in the M/C 34 side across each of the pressure increase control valves 46FL, 46FR.

These SM valves 50FL, 50FR are at an open position that opens up the line when electric power is OFF and are switched to the closed position when energized by the brake controller 30. It must be noted here that in the present embodiment, as will be described later, the SM valves 50FL, 50FR are integrally formed with the pressure regulation valves and so, the closed position referred to here does not refer to the position in which the line is closed for all pressure conditions but refers to a position (pressure regulation position) where pressure regulation valve functions are performed in which the line opens when the pressure applied from the W/C 2FL, 2FR sides is no less than a predetermined pressure.

Moreover, restrictions 50FLS, 50FRS (collectively referred to as 50s) are provided on the M/C 34 side across a switching region, which is where the opening and closing (in which a ball 50g (refer to FIG. 4) described later which is a valve body makes contact with a seat) of the SM valves 50FL, 50FR are performed, for applying pressure between the restrictions 50FLS, 50FRS themselves and the switching region.

Here, the construction of SM Valves 50FL, 50FR are described with reference to FIG. 4.

Figure 4:
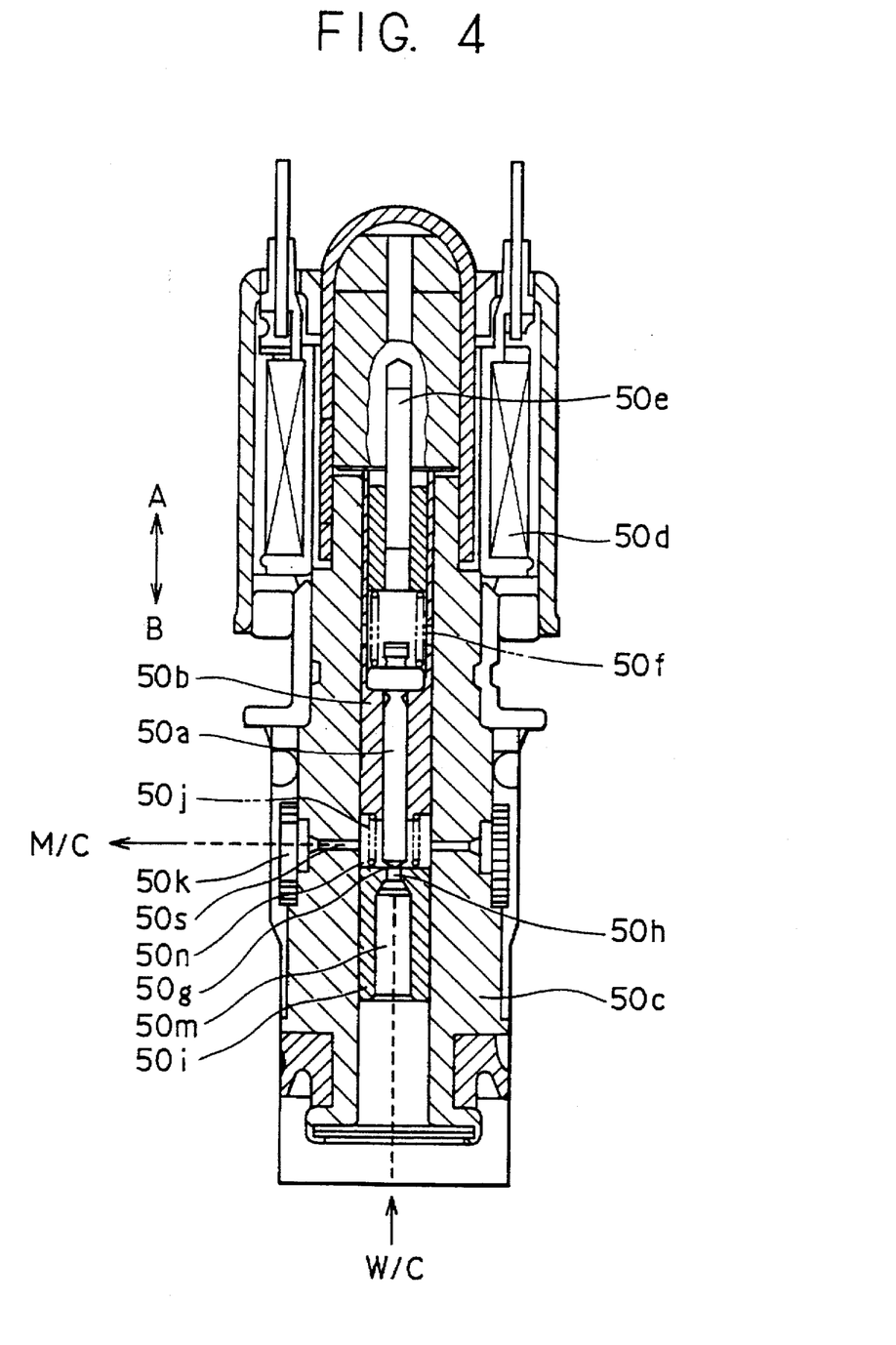
FIG. 4 is an explanatory diagram showing a cross-section of a construction of an SM valve according to the first embodiment.

As shown in FIG. 4, the SM valves 50FL, 50FR mainly include a shaft 50a which slides in the directions of arrows A, B, a sleeve 50b into which the shaft 50a is inserted, a guide 50c into which the sleeve 50b is inserted, a plunger 50e which is moved in the direction of arrow B by magnetic force of a coil 50d, a first spring 50f which transmits the movement of the plunger 50e to the shaft 50a, a ball 50g (provided at the tip of the shaft 50a) for opening and closing the line, a seat 50i (which has a small opening 50h) on which the ball 50g seats, and a second spring 50j which pushes the sleeve 50b and the shaft 50a in the direction of arrow A.

Also, the M/C 34 side and the W/C 2FL, 2FR sides are connected by a fluid route (shown in broken lines) which goes through an M/C side communication hole 50k, a space (switching region) formed by the ball 50g and the seat 50i, and a W/C side communication hole 50m (which communicates with the opening 50h).

In the present embodiment in particular, a restriction 50s having a diameter smaller than the diameter of the other lines is formed between an internal chamber 50n, which is across the opening 50h on the M/C 34 side and which is where the second spring 50j and the like are contained, and the M/C side communication hole 50k. Therefore, when brake fluid is returned to the M/C 34 side via this restriction 50s, pressure is applied between the restriction 50s itself and the switching region. In other words, this restriction 50s moderates the rapid decline in pressure of the brake fluid released to the M/C 34 side from the switching region and thus, prevents the occurrence of aeration.

Also, in these SM valves 50FL, 50FR, normally, the shaft 50a moves in the direction of arrow A by means of a pressing force of the second spring 50j to open the fluid route; however, when the coil 50d is energized, the excitation energy is transmitted to the first spring 50f via the plunger 50e and the shaft 50a moves in the direction of arrow B to make contact with the seat in opposition to the pressing force of the second spring 50j to close the fluid route. Here, when the pressure of the W/C 2FL, 2FR sides is greater than the pressing force of the first spring 50f, even if the closed position has been set with the receipt of the excitation energy, the fluid route will open in accordance with such pressure.

It must be noted that in the present embodiment, while SM valves 50FL, 50FR have constructions in which, for example, the switching valve and the regulation valve are integrally formed and the restriction 50s is provided as restriction 50FLS, 50FRS in the interior of SM valves 50FL, 50FR, a construction in which, for example, the SM valve is constructed as a switching valve which can switch to the open position and the closed position (in which there is no pressure being applied) and the pressure regulation valve (which opens when the pressure applied from the W/C side is no less than a predetermined amount) is provided in parallel to this SM valve may also be employed. Also, if the construction position of the restriction 50s is at a downstream side of the region where pressure is released (i.e., pressure regulation is performed), there is no need to form the restriction 50s integrally with the SM valve nor with the pressure regulation valve.

Going back to FIG. 3, relief valves 54FL, 54FR are connected in parallel with each of the SM valves 50PL, 50FR for supplying pressurized fluid from the M/C 34 to the pressure increase control valves 46FL, 46FR when the hydraulic pressure in the M/C 34 side becomes greater than the hydraulic pressure of the pressure increase control valves 46FL, 46FR.

Also, the fluid routes 42, 44 are each provided with reservoirs 56, 58 for temporarily storing brake fluid discharged from the pressure decrease control valves 48FL, 48RR, and, furthermore, with pumps 60, 62 for force feeding such brake fluid to a fluid route 42Fa between the SM valve 50FL and the pressure increase control valve 46FL, and fluid route 44Fa between the SM valve 50FR and the pressure increase control valve 46FR. It must be noted here that accumulators 64, 66 which control the pulsation of the internal hydraulic pressure are provided in the discharge routes of the brake fluid from each of the pumps 60, 62.

Furthermore, the fluid routes 42, 44 are provided with fluid supply routes 42P, 44P for directly supplying brake fluid from a reservoir 68, which is provided at the upper part of the M/C 34, to the pumps 60, 62 via the M/C 34 during the execution of brake TRC control which is explained later. These fluid supply routes 42P, 44P are each provided with reservoir cut valves (SR valves) 70FL, 70FR for opening and closing these routes 42P, 44P.

It must be noted here that normally SR valves 70FL, 70FR are closed and switch to the open position when energized by the brake controller 30. Also, the pumps 60, 62 are each driven by a motor 80 during the execution of brake TRC control.

Next, ABS control and TRC control which are executed by the brake controller 30 are briefly described.

It must be noted here that normally when ABS control and TRC control are not being executed, all the magnetic valves of the hydraulic circuit 40 are in the OFF state. To put it more concretely, as magnetic valves for switching to TRC control, SM valves 50FL, 50FR are open and SR valves 70FL, 70FR are closed; and as control valves of the W/C 2FL, 2FR of the driving wheels side, pressure increase control valves 46FL, 46FR are open and pressure decrease control valves 48FL, 48FR are closed.

① ABS control

Figure 5A:
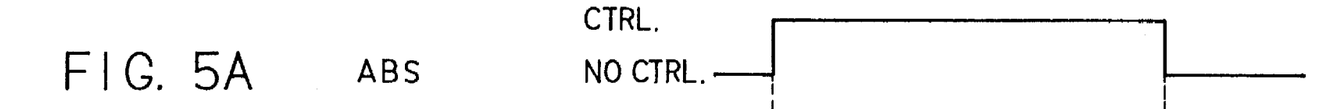
FIGS. 5A–5F are timing charts showing an ABS control process according to the first embodiment.
Figure 5B:
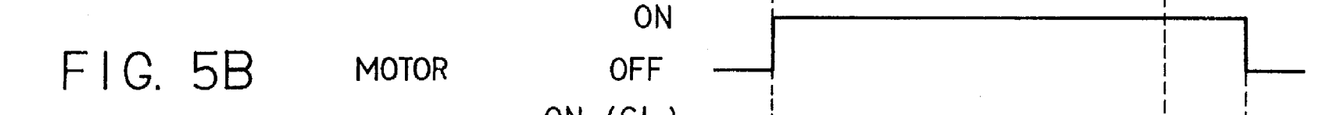
Figure 5C:
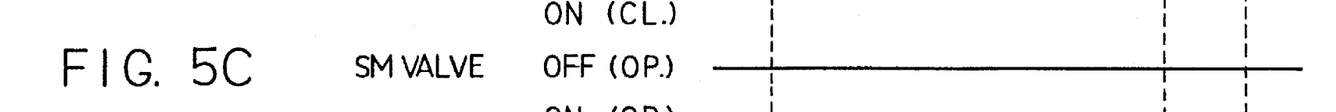
Figure 5D:
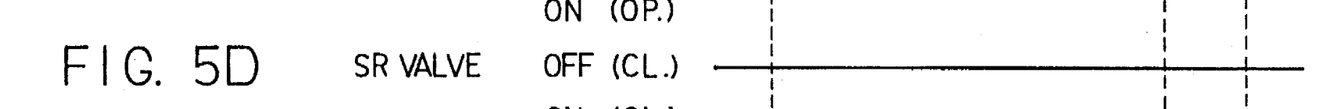

When slips occur in the vehicle wheels FL-RR due to, for example, sudden brake operations of a driver along a road having a low coefficient of friction μ, as shown in FIG. 5A, ABS control is commenced, the motor 80 is driven to operate pumps 60, 63 (FIG. 5B), and by switching ON and OFF (actuating/deactuating) the pressure increase control valves 46FL-46RR (FIG. 5E) and the pressure decrease control valves 48FL-48RR (FIG. 5F) which are the hydraulic control valves, the hydraulic pressure of each of the W/C 2FL-2RR is controlled by appropriately switching between the pressure decrease, pressure hold and pressure increase states in accordance with the slip conditions of each of the wheels FL-RR.

Figure 5E:
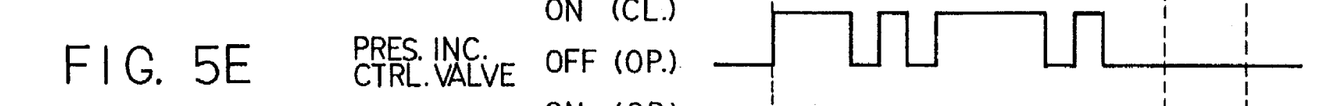
Figure 5F:
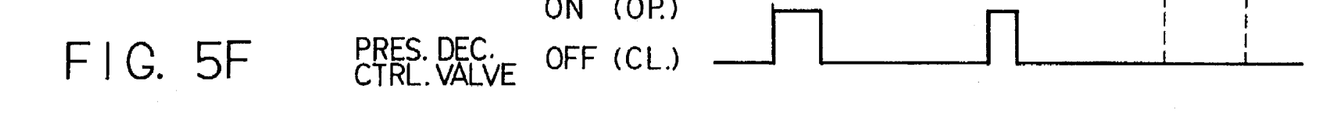

To put it more concretely, when it is determined that the vehicle wheels have a tendency to lock, the pressure control valves are controlled to the pressure decrease position (the pressure increase control valve is actuated (closed); the pressure decrease control valve is actuated (opened)) to decrease the hydraulic pressures of the W/C 2FL-2RR and prevent vehicle wheel locking. During this time, the decompressed fluid from the W/C 2FL-2RR is discharged to reservoirs 56, 58 via pressure decrease control valves 48FL-48RR and furthermore, by driving the motor 80, the fluid amount that has accumulated in reservoirs 56, 58 is circulated back to the normal brake system.

Also, during ABS control, when it is determined that the tendency of the vehicle wheels to lock has disappeared, the pressure control valves of the W/C 2FL, 2RR are controlled to the pressure increase position (the pressure increase control valve is deactuated (opened); the pressure decrease control valve is deactuated (closed)) to increase the W/C hydraulic pressure. It must be noted here that because the vehicle wheels tend to lock when the W/C hydraulic pressure is suddenly increased, vehicle wheel lock is prevented and vehicle safety is ensured by gradually increasing the W/C hydraulic pressure by controlling the pressure control valves to the pressure hold position (the pressure increase control valve is actuated (closed) and the pressure decrease control valve is deactuated (closed)).

Also, after the end of the ABS control operations, the motor 80 is driven for a predetermined period of time to pump out the fluid in the reservoirs 56, 58 to ensure the smooth execution of the next ABS control operation.

② TRC control

When acceleration slips occur in the driving wheels FL, FR due to, for example, sudden acceleration operations of the driver along a road having a low μ, E/G TRC control which controls the output torque of the internal combustion engine 10 is started together with the commencement of brake TRC control by sending a decrease fuel injection amount or an ignition timing lag command to the E/G controller 20.

Figures 6A, 6B, 6C:
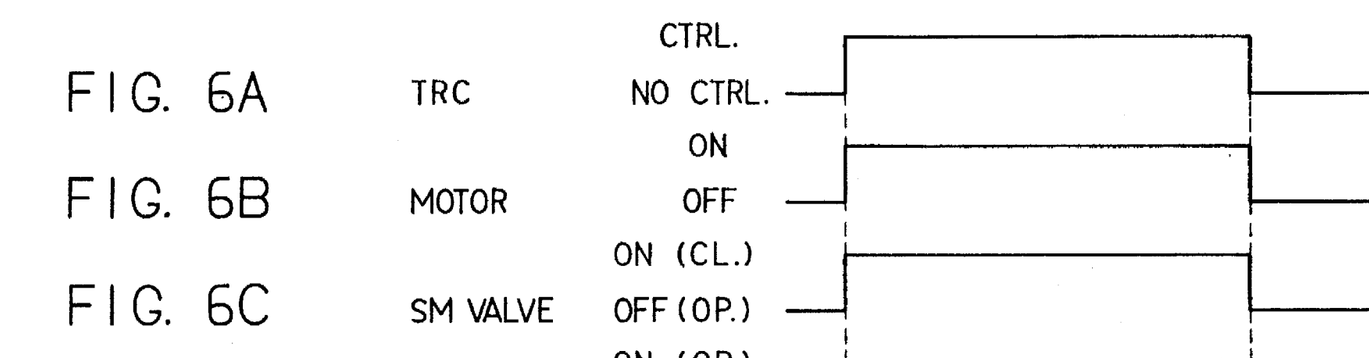
FIGS. 6A–6F are timing charts of a TRC control process according to the first embodiment.
Figures 6D, 6E, 6F:
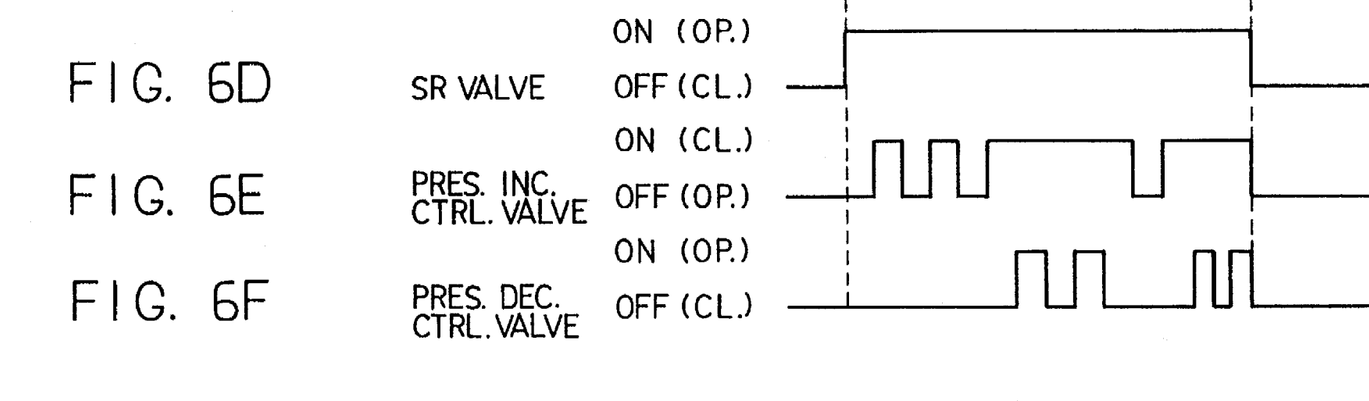

As shown in FIG. 6A, this brake TRC control applies braking forces on the driving wheels FL, FR to suppress acceleration slips by driving the motor 80 to operate pumps 60, 62 (FIG. 6B), actuating (energizing) SM valves 50FL, 50FR (FIG. 6C) and SR valves 70FL, 70FR (FIG. 6D), and actuating and deactuating pressure increase control valves 46FL, 46FR (FIG. 6E) and pressure decrease control valves 48FL, 48FR (FIG. 6F).

To put it more concretely, acceleration slips are suppressed by driving pressure increase control valves 46FL, 46FR (FIG. 6E) and pressure decrease control valves 48FL, 48FR (FIG. 6F) and by appropriately switching the W/C to the pressure increase, pressure hold and pressure decrease positions.

In this way, in the present embodiment, the restriction 50s is provided across the switching position of the line in SM valves 50FL, 50FR in the M/C 34 side. Therefore, by means of this restriction 50s, pressure can be applied between the restriction 50s itself and the switching region when, for example, returning high pressure brake fluid brought about by the TRC control to the M/C 34 side. In other words, this restriction 50s moderates the sudden drop in pressure of the brake fluid released to the M/C 34 side from the switching region and because it can prevent the occurrence of aeration, this restriction 50s gives a remarkable effect of significantly improving safety.

In particular, in the present embodiment, the provision of the restriction 50s and the pressure regulation valve mechanism in the SM valves 50FL, 50FR themselves gives the advantage of making the device compact.

(Second Embodiment)

Next, the vehicle brake pressure controller of a second embodiment is described hereinafter.

The present embodiment is an application of the present invention to a front engine rear drive (FR) four-wheeled vehicle and is one example where an M/C self-contained M/C return pump is used as the pump.

Figure 7:
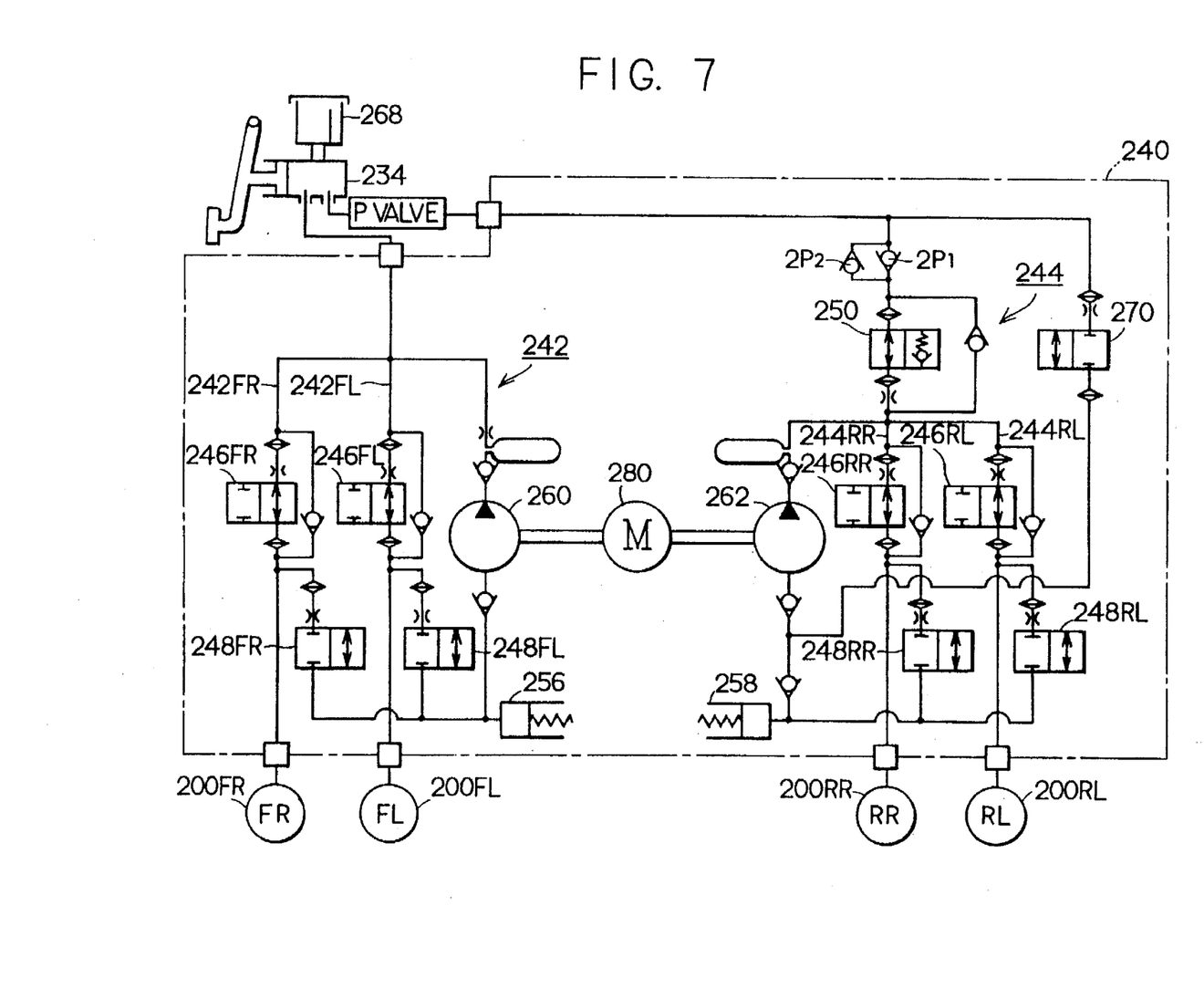
FIG. 7 is an explanatory diagram showing a construction of a hydraulic circuit according to a second embodiment of the present invention.

The hydraulic circuit 240 of the present embodiment has a construction which corresponds to the FR vehicle and, as shown in FIG. 7, a hydraulic circuit 240 includes two lines of fluid routes 242, 244 for supplying brake fluid force fed from a fluid passage of a M/C 234 to a front left wheel FL and a front right wheel FR, and a rear left wheel RL and a rear right wheel RR, and supplying brake fluid force fed from a fluid route of a reservoir 268 of the M/C 234 to the rear right wheel RR and the rear left wheel RL. Also, among these fluid routes 244, 242, fluid routes 242FL, 242FR leading to W/C 200FL, 200FR of the front left and right wheels FL, FR, which are the driven wheels are each provided with pressure increase control valves 246FL, 246FR which can be switched to a pressure increase position for opening the routes 242FL, 242FR and a hold position for closing the same routes, and pressure decrease control valves 248FL, 248FR for discharging brake fluid contained inside each of the W/C 200FL, 200FR.

On the other hand, among these above-described fluid routes 242, 244, fluid routes 244RL, 244RR leading to W/C 200RL, 200RR of the rear left and right wheels RL, RR, which are the driving wheels, are provided with pressure increase control valves 246RL, 246RR and pressure decrease control valves 248RL, 248RR in the same way as the driven wheels side. Also, the SM valve 250 as a switching valve similar to that of the first embodiment and which switches between the open position and the closed position is provided across each of the pressure increase control valves 246RL, 246RR in the M/C 234 side.

As shown in FIG. 7, in this second embodiment, the SM valve 250 can be switched between the open and the closed positions (where the valve opens at the predetermined pressure). A pair of pressure regulation valves 2P1, 2P2 are provided across the SM valve 250 in the M/C 234 side in order for the SM valve 250 to perform the same functions as that of the restriction described before. It must be noted here that in the present embodiment, the SM valve 250 has almost the same construction as that of the first embodiment except that it is not provided with an internal restriction.

That is, as the pair of pressure regulation valves 2P1, 2P2, a first pressure adjustment valve 2P1, which prevents the flow of brake fluid from the M/C 234 side to the W/C 200RL, 200RR sides and which opens the route from the W/C 200RL, 200RR side to the M/C 234 side at a predetermined pressure (which is set lower than the valve opening pressure of the SM valve 250), and a second pressure regulation valve 2P2, which is configured parallel to the first pressure regulation valve 2P1, prevents the flow of brake fluid from the W/C 200RL, 200RR sides to the M/C 234 side while opening the route from the M/C 234 side to the W/C 200RL, 200RR sides, are provided between the M/C 234 and the SM valve 250.

Therefore, when the pressure is high in the M/C 234 side, high pressure brake fluid is supplied to the SM valve 250 side (M/C 234 side) via the second pressure regulation valve 2P2. Conversely, if pressure is high in the SM valve 250 side, the first pressure regulation valve 2P1 opens and high pressure brake fluid is released to the M/C 234 side.

It must be noted here that while the SM valve 250, which is formed by integrating the switching valve and the pressure regulation valve, is used in the present embodiment, a different construction may be employed in which the SM valve is formed as a switching valve that switches to the open position and the closed position (the position in which the valve does not open even if pressure is applied) and the pressure regulation valve (which opens the route when a pressure no less than the predetermined pressure is applied from the W/C side) is provided in parallel to the SM valve.

Also, the fluid routes 242, 244 are provided with reservoirs 256, 258 for temporarily storing brake fluid discharged from the pressure decrease control valves 248FL, 248FR, 248RL, 248RR and, furthermore, pumps 260, 262 for pumping up the brake fluid from the reservoirs 256, 258. Both of the pumps 260, 262 are driven by the motor 280.

Moreover, the fluid route 244 is provided with the SM valve 250 which opens and closes the fluid route from the M/C 234 to the pressure increase control valves 246RR, 246RL and the SR valve 270 for opening and closing the route from the M/C 234 to the inlet side of the pump 262.

Also, when a slip occurs in the vehicle tires FL-RR during vehicle brake control, a brake controller (not shown in the Figure) controls the brake hydraulic pressure in each of the W/C 200FL-200RR in accordance with the slip conditions of each of the tires FL-RR by commencing ABS control and switching ON and OFF each of the pressure increase control valves 246FL-246RR and pressure decrease control valves 248FL-248RR inside the hydraulic circuit 240.

When slips occur in the driving wheels RL, RR during vehicle acceleration, braking is applied to the driving wheels RL, RR to control slips by commencing E/G·TRC control which controls the output torque of the internal combustion engine, actuating the SM valve 250 and the SR valve 270 inside the hydraulic circuit 240, and actuating and deactuating the pressure increase control valves 246RL, 246RR and the pressure decrease control valves 248RL, 248RR.

In this way, in the present embodiment, a pair of pressure regulation valves 2P1, 2P2 which perform the same functions as the restriction are installed across the SM valve 250 on the M/C 234 side. Therefore, pressure can be applied between the first pressure regulation valve 2P1 itself and the SM valve 250 by means of these pressure regulation valves 2P1, 2P2 when, for example, brake fluid having a high pressure due to the TRC control is released to the M/C 234 side. In other words, there is the effect of remarkably improving safety because the occurrence of aeration can be prevented by moderating the sudden pressure drop in the brake fluid released to the M/C 234 side from the SM valve 250 (which is provided in the pressure regulation position).

(Third Embodiment)

Next, a third embodiment of the vehicle brake pressure controller is described.

The present embodiment is an application of the present invention to an FR vehicle which has a hydraulic circuit for executing ABS control and TRC control and is one example where a reservoir self-contained M/C return pump is used as the pump.

Figure 8:
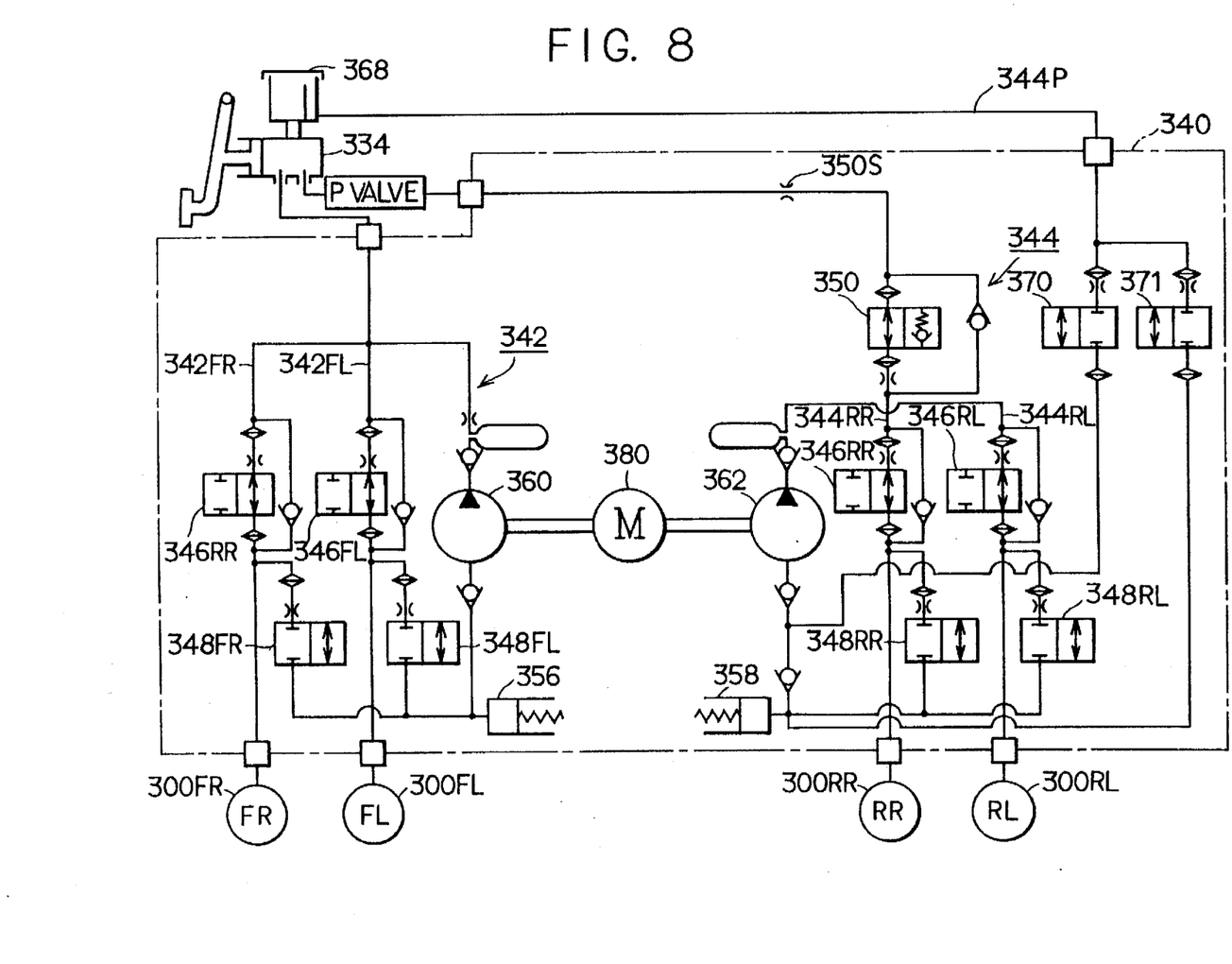
FIG. 8 is an explanatory diagram showing a construction of the hydraulic circuit according to a third embodiment of the present invention.

As shown in FIG. 8, a hydraulic circuit 340 includes two lines of fluid routes 342, 344 for supplying brake fluid force fed from a fluid route of an M/C 334 to a front left wheel FL and a front right wheel FR, and a rear left wheel RL and a rear right wheel RR, and supplying brake fluid force fed from a fluid passage of a reservoir 368 of the M/C 334 to the rear right wheel RR and the rear left wheel RL.

In addition, pressure increase control valves 346FL, 346FR and pressure decrease control valves 348FL, 348FR are provided in fluid routes 342FL, 342FR to W/C 300FL, 300FR of the front left and right wheels FL, FR which are the driven wheels.

On the other hand, in the same way as the driven wheels side, pressure increase control valves 346RL, 346RR and pressure decrease control valves 348RL, 348RR are provided in fuel routes 342RL, 342RR to W/C 300RL, 300RR of the rear left and right wheels RL, RR which are the driving wheels. Also, an SM valve 350 which can be switched to the open position and the closed position (pressure regulation position) is provided as the switching valve across the pressure increase control valves 346RL, 346RR in the M/C 334 side.

In particular, in the present embodiment, a restriction 350s which acts in the same way as that of the first embodiment is provided across the SM valve 350 in the M/C 334 side.

It must be noted here that while the SM valve 350 and the restriction 350s are formed separately, they can also be formed integrally as in the first embodiment. Also, while the SM valve 350 has been formed by integrating the switching valve and the pressure regulation valve, another construction where, for example, the SM valve is configured as a switching valve which switches to an open position and a closed position (which does not open even if pressure is applied) and the pressure regulation valve (which opens the fluid route when the pressure applied from the W/C side is no less than a predetermined pressure) is provided in parallel with the SM valve can also be employed.

Also, the fluid routes 342, 344 are provided with reservoirs 356, 358 for temporarily storing brake fluid discharged from the pressure decrease control valves 348FL-348RR and, furthermore, pumps 360, 362 for pumping up the brake fluid from the reservoirs 356, 358. Both of the pumps 360, 362 are driven by a motor 380.

Furthermore, a fluid supply route 344P is provided in the fluid route 344 for directly supplying brake fluid from the reservoir 368 provided in an upper portion of the M/C 334 to the pump 362. A first SR valve 370 is provided in this fluid supply route 344P for opening and closing it. It must be noted here that a second SR valve 371 is provided in the route from the reservoir 368 of the M/C 334 side to the reservoir 358 of the W/C 300RR, 300RL side.

Then, because the sudden drop in pressure (in the pressure regulation region) from the SM valve 350 to the M/C 334 side is also moderated in the present embodiment by applying pressure by means of the restriction 350s, the occurrence of aeration in the SM valve 350 can be prevented.

In this way, by providing the hydraulic circuit 340 which includes the reservoir self-contained M/C return self-contained pump 360, 362, the SM valve 350, SR valves 370, 371 and the like in the FR vehicle, in the same way as the first embodiment, the present embodiment which executes ABS control and TRC control gives the effect of being able to prevent aeration and the like.

It must be noted here that while restrictions 50FLS, 50FRS, 350s are provided in the first and third embodiments, the pair of pressure regulation valves 2P1, 2P2 shown in the second embodiment may also be used in place of these restrictions. In the same way, the pair of pressure regulation valves 2P1, 2P2 used in the second embodiment may be replaced by the restriction shown in the first and third embodiments.

It must be noted here that the present invention is not limited in any way to the above-described embodiments and it goes without saying that various embodiments can be implemented within a scope that does not depart from the spirit of the present invention.

For example, the pressure increase and the pressure decrease control valves may not only be formed separately but also as one integral three-position valve.

Also, the vehicle brake pressure controller of the present embodiment can be applied to any construction (M/C return) in which the brake fluid is returned to the M/C side when the pump discharge pressure is no less than a predetermined value.

Furthermore, while the hydraulic circuit is applied to the cases where the M/C self-contained M/C return, reservoir self-contained M/C return, self-contained pump and the like are used, there is no need to be limited to self-contained pumps.

We claim:

1. A vehicle brake pressure controller for applying brake pressure on wheel cylinders of vehicle wheels, aside from when a driver applies brakes, to control vehicle maneuverability, said vehicle brake pressure controller comprising:

high pressure supply means for discharging high pressure brake fluid to a line which connects a master cylinder and said wheel cylinders, said wheel cylinders corresponding to a plurality of driving wheels and a plurality of driven wheels;

switching means provided between a location where brake fluid supplied by said high pressure supply means is supplied to said line and said master cylinder for switching between an open condition for opening said line and a pressure regulation condition for releasing such high hydraulic pressure to the master cylinder side when the hydraulic pressure supplied from said high pressure supply means is no less than a predetermined pressure; and pressure application means provided between a pressure regulation member and a point at which said line branches to a corresponding one of said driven wheels, which sets said pressure regulation condition, in said master cylinder side for applying pressure between said pressure regulation member and itself.

2. A vehicle brake pressure controller according to claim 1, wherein said pressure application means is a restriction which controls a flow of brake fluid.

3. A vehicle brake pressure controller according to claim 1, wherein said pressure application means is an auxiliary pressure regulation valve whose valve opening pressure is lower than said predetermined pressure set for said pressure regulation condition.

4. A vehicle brake pressure controller according to any one of claims 1–3, wherein said switching means includes:

a switching valve which switches to an open position to open said line and a closed position to close said line; and a pressure regulation valve for releasing high hydraulic pressure to said master cylinder side when the hydraulic pressure supplied from said high pressure supply means exceeds a predetermined pressure when said switching valve is in the closed position.

5. A vehicle brake pressure controller according to any one of claims 1–3, wherein said switching means is a switching valve which switches to an open position for opening said line and a pressure regulation position for releasing said high hydraulic pressure to said master cylinder side when said hydraulic pressure supplied from said high pressure supply means is no less than the predetermined pressure.

6. A vehicle brake pressure controller according to any one of claims 1–3, wherein said high pressure supply means is one of a pump and an accumulator.

7. A vehicle brake pressure controller which has a common pump as a source of pressure and which is for executing anti-skid control and traction control, said vehicle brake pressure controller comprising:

a pressure control valve provided between a position in a line, which connects a vehicle's master cylinder side and a plurality of wheel cylinder sides corresponding to a plurality of driving wheels and a plurality of driven wheels, where brake fluid is provided by said pump to said line and said wheel cylinder for controlling supply and discharge of brake fluid to and from such wheel cylinder;

a switching valve provided between a position in said line where brake fluid provided by said pump is supplied to said line and a master cylinder, and which is switchable to an open position and a closed position;

switching control means for switching said switching valve to an open position during anti-skid control and between the open and closed positions to regulate the pressure of brake fluid generated from said pump; and pressure application means for applying pressure to a pressure regulation valve, which releases high hydraulic pressure to said master cylinder side, and between such pressure regulation valve and itself between said pressure regulation valve in said master cylinder side and a point at which said line branches to a corresponding one of said driven wheels when hydraulic pressure supplied from said high pressure supply means is no less than a predetermined pressure when said switching valve is in the closed position.

8. A vehicle brake pressure controller according to claim 7, wherein said pressure application means is a restriction which controls a flow of brake fluid.

9. A vehicle brake pressure controller according to claim 7, wherein said pressure application means is an auxiliary pressure regulation valve whose valve opening pressure is set lower than a valve opening pressure of said pressure regulation valve.

* * * * *